(12) United States Patent
Mitchell et al.

(10) Patent No.: US 7,067,797 B1
(45) Date of Patent: Jun. 27, 2006

(54) OPTICAL POSITION ENCODER HAVING ALIGNMENT INDICATORS PROVIDING QUANTITATIVE ALIGNMENT INDICATIONS

(75) Inventors: Donald K. Mitchell, Wayland, MA (US); William G. Thorburn, Whitinsville, MA (US); Andrew Goldman, Waltham, MA (US); Keith M. Hinrichs, Natick, MA (US)

(73) Assignee: GSI Group Corporation, Billerica, MA (US)

( * ) Notice: Subject to any disclaimer, the term of this patent is extended or adjusted under 35 U.S.C. 154(b) by 35 days.

(21) Appl. No.: 10/941,640

(22) Filed: Sep. 15, 2004

(51) Int. Cl.
*G01D 5/34* (2006.01)

(52) U.S. Cl. .................................. 250/231.13

(58) Field of Classification Search ........................ 250/231.13–231.18; 356/616, 617; 341/13
See application file for complete search history.

(56) References Cited

U.S. PATENT DOCUMENTS 4,360,730 A    11/1982   Breslow ..................... 250/231
4,772,872 A *  9/1988   Villani ............................. 341/9

* cited by examiner

*Primary Examiner*—Thanh X. Luu
(74) *Attorney, Agent, or Firm*—BainwoodHuang

(57) ABSTRACT

An optical encoder includes an optical source, a scale, an optical detector and signal processing circuitry. The scale is operative with a light beam from the source to generate an optical pattern such as a line pattern extending in an X direction of relative movement between the scale and the source. The detector generates analog detector output signals indicative of the location of the optical pattern on the detector in an alignment direction orthogonal to the X direction. The detector may include two bi-cell elements spaced apart in the X direction, each element including two cells of complementary shape, such as a sharks-tooth. The signal processing circuitry operates in response to the detector output signals to generate an alignment value indicating a polarity and a magnitude of misalignment between the detector and the scale in the alignment direction. A method of providing information to a user regarding alignment of a detector and an encoder scale employs a graphical alignment indicator displayed on a computer display. The graphical alignment indicator has a bipolar indicator scale and a marker whose location on the scale is based on the alignment values such that the magnitude and polarity of misalignment is indicated.

30 Claims, 9 Drawing Sheets

OPTICAL POSITION ENCODER HAVING ALIGNMENT INDICATORS PROVIDING QUANTITATIVE ALIGNMENT INDICATIONS

BACKGROUND OF THE INVENTION

The present invention is related to the field of optical position encoders.

Optical position encoders are often sold in an unassembled or "kit" form so as to be integrated into higher-level assemblies. In one common configuration, the optical encoder includes a scale, such as an elongated linear scale, that is to be placed on an item whose position is to be measured. The encoder also includes a sensor assembly that is to be mounted in a relatively stationary position immediately adjacent to the scale. The sensor assembly includes an optical source, such as a laser diode, and a photodetector. Light from the source is diffracted by a grating pattern on the scale and produces an interference pattern at the detector. Motion of the scale produces a corresponding apparent motion of the interference pattern which is detected by the detector. The detector output(s) are processed by electronic circuitry to convert the raw detector signals into a higher-level indication of position (such as a binary word) that can be utilized by the system.

For best operation of the encoder, it is necessary that the sensor assembly and the scale be accurately aligned. In a linear encoder, for example, it is desirable that the sensor be aligned with the scale in a Y-axis direction extending perpendicular to both an X-axis direction of relative motion and a Z-axis direction of separation of the scale and sensor assembly. In addition to this linear Y-axis alignment, it is also necessary to achieve a desired rotational or "theta-Z" alignment between the sensor assembly and the scale about the Z axis. Among other benefits, achieving the correct theta-Z alignment can improve signal strength and quality from the detector. Similar considerations apply in a rotary encoder.

It has been known to employ a so-called Lissajous display to ascertain the alignment between a scale and a sensor assembly in an optical encoder. The Lissajous display can be used in connection with encoders that implement quadrature-based sampling of the optical diffraction pattern. One or more detector output signals are used to derive a sine signal, and other detector signal(s) are used to derive a cosine signal. These signals are displayed together on orthogonal axes of an oscilloscope. As the Y and theta-Z alignment are changed, the roundness and size of the Lissajous pattern changes in a corresponding manner, and thus can be used to estimate when correct alignment has been achieved.

SUMMARY OF THE INVENTION

In currently known methods of aligning optical encoders, such as the Lissajous-based method described above, there is little or no quantitative information provided to a user about the magnitude of misalignment. It is possible, for example, to achieve an acceptable Lissajous pattern at a position of marginal alignment, such that even a relatively minor perturbation of an assembled encoder may cause performance to degrade substantially. This marginal alignment can result in part because the Lissajous pattern is sensitive to aspects of the installed encoder other than alignment. It would be desirable to have an alignment technique that more directly reflects alignment per se, and that provides quantitative alignment information so as to enable an installer or other user to readily assess both the polarity (direction) and magnitude of any misalignment.

The above and other objects of the present invention are addressed by a disclosed optical encoder that includes an optical source, a scale spaced apart from the source and extending in a direction of relative motion between the scale and the source, an optical detector, and signal processing circuitry. The scale is operative in conjunction with a light beam from the optical source to generate an optical pattern at a detector location. In one embodiment, the optical pattern is a line pattern extending in the direction of relative motion, which is generated from a diffractive optical element formed on the scale.

The optical detector is located at the detector location, and it is operative to generate analog detector output signals being indicative of the location of the optical pattern on the detector in an alignment direction orthogonal to the direction of relative motion between the scale and the source. Embodiments of suitable detectors are disclosed. In one embodiment, the detector includes two bi-cells spaced apart in the direction of relative motion, each bi-cell including two cells of complementary shape, such as a sharks-tooth shape. The signal processing circuitry is operative in response to the analog detector output signals to generate an alignment value indicating a polarity and a magnitude of misalignment in the alignment direction between the optical detector and the scale.

In one embodiment, the analog detector output signals are indicative of the location of the optical pattern on the optical detector at two or more locations spaced apart in the direction of relative motion, such as through the use of two or more of the above-described detectors. The signal processing circuitry is further operative in response to the analog detector output signals to generate a theta-Z-alignment value indicating a polarity and a magnitude of rotational misalignment about the Z axis between the optical detector and the scale.

Also disclosed is a method of providing information to a user regarding alignment of an optical detector and an encoder scale in an alignment direction orthogonal to both the direction of relative motion between the detector and the scale and the direction in which the encoder and scale are spaced apart. The method includes obtaining optical detector output signals indicative of a the location of an optical pattern on the optical detector in the alignment direction, the optical pattern being generated by the encoder scale in conjunction with a light beam from an optical source. Alignment values are continually generated in response to the detector output signals, each alignment value indicating a polarity and a magnitude of misalignment in the alignment direction between the optical detector and the encoder scale. A graphical alignment indicator is displayed for a user, for example on a conventional computer display. The graphical alignment indicator has an indicator scale and a marker. The indicator scale is a bipolar indicator scale capable of indicating both polarity and magnitude of misalignment, such as a bar-shaped icon with a zero point at its middle. The marker position is established based on the alignment values such that the magnitude and polarity of misalignment between the optical detector and the indicator scale are indicated by the graphical alignment indicator.

The above method can be used in a process of aligning the optical encoder. As the graphical alignment indicator is being displayed, the relative positions of the scale and the optical detector can be adjusted while the display is monitored, resulting in movement of the marker with respect to the scale. The adjusting continues until the alignment indicator indicates that a desirable degree of alignment has been achieved, e.g., until the marker is positioned at a suitably central part of the scale.

The above method can also be augmented to provide information about theta-Z alignment as well.

In general, the disclosed techniques may be employed in both linear and rotary encoders. In a linear encoder, a Cartesian coordinate system is utilized for reference. The direction of relative motion is designated the X direction; the direction in which the scale and the detector are spaced apart is the Z direction; and the direction orthogonal to both the X and Z directions is designated the Y direction. The Y direction is usually parallel to the lines on the scale that form an optical grating. In a rotary encoder, the Y and X axes are replaced by radial (R) and angular (θ) axes respectively. That is, the θ axis extends in the direction of relative motion, and the R axis extends parallel to the grating lines, which are generally arranged in an annular fashion on an annular or disk-shaped scale.

Other features and advantages of the presently disclosed methods and apparatus will be apparent from the Detailed Description hereinbelow.

DETAILED DESCRIPTION

Figure 1:
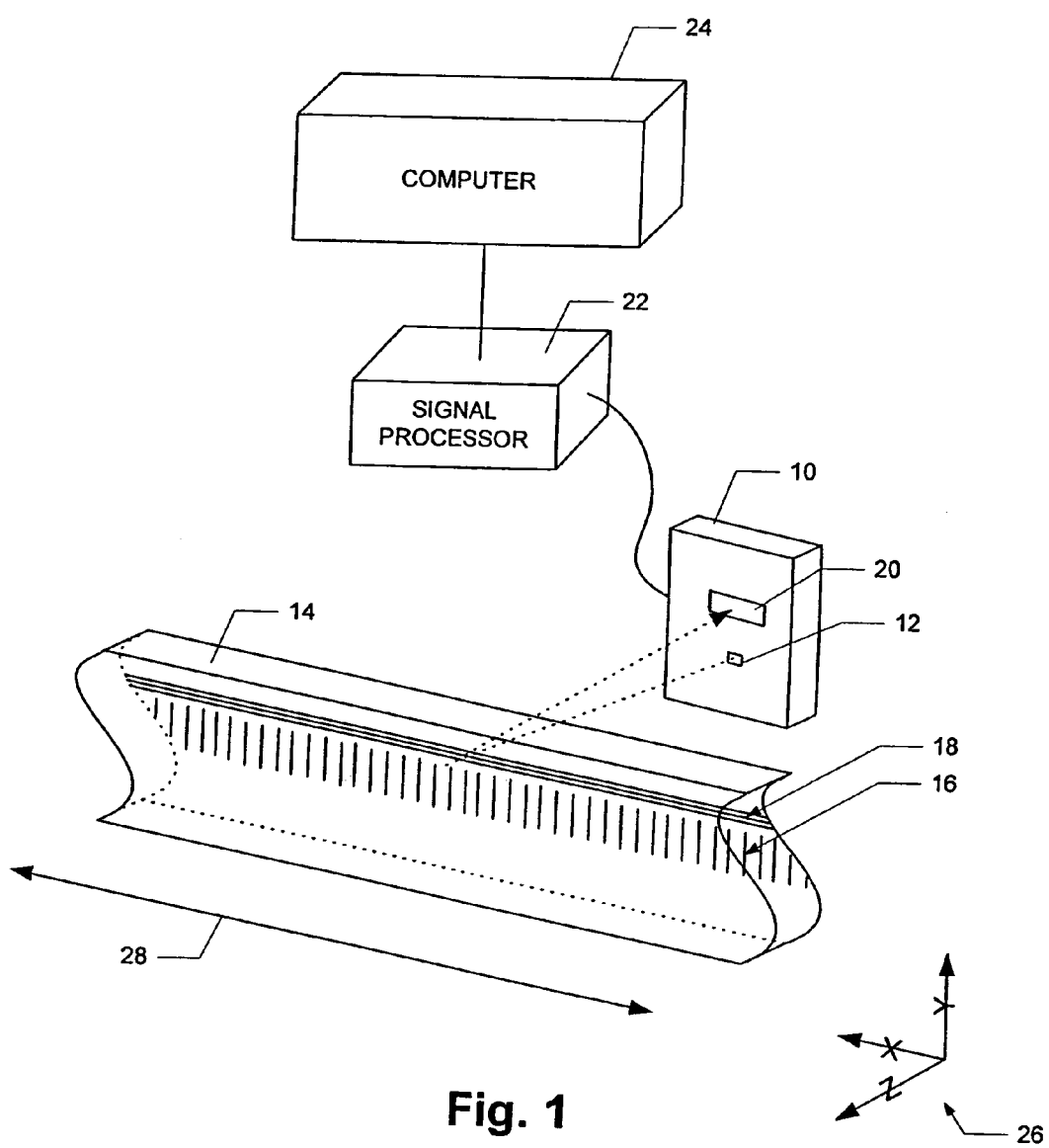
FIG. 1 is a schematic diagram of an optical position encoder system with alignment indication in accordance with the present invention.

In FIG. 1, sensor apparatus 10 is installed as part of a reflective, diffractive optical encoder. A source 12 illuminates a scale 14 on which a periodic, reflective diffraction grating 16 is formed. The diffraction grating 16 is also referred to as the "main track", as distinct from a "reference track" 18 also formed on the scale. Light from the source 12 is reflectively diffracted from the scale 14 toward the sensor apparatus 10, which in the illustrated embodiment includes an optical detector 20. The diffraction grating 16 generates multiple orders of diffracted light which interfere with each other to form an optical fringe pattern (not illustrated) on the detector 20. The samples from the detector 20 are sent to a signal processor 22 which calculates a fringe phase for each sample. A computer 24 is coupled to the signal processor 20 for carrying out an alignment process as described below.

For ease of reference, a set of coordinate axes 26 are shown to indicate directions of interest. The X axis lies along the direction of relative motion, which is also indicated by line 28. The Y axis lies in the plane of the scale 14 in a direction orthogonal to the X axis. In the illustrated embodiment, the Y axis is parallel to the individual elements of the grating 16. The scale 14 and the sensor apparatus 10 are separated in the Z direction. It will be appreciated that the interference fringe pattern incident on the detector 20 extends in both the X and Y directions, with the grating-created intensity variations in the X direction and a typical beam profile in the Y direction (i.e., a central maximum and gradually lower intensity away from the center along the Y axis).

The X component of the fringe pattern is ideally a sinusoid characterized by a period P. Conceptually, when the scale 14 moves laterally relative to the detector 20 along the direction indicated by line 28, the fringe pattern has an apparent motion by a proportional distance on the face of detector 20. An accurate measurement of the changes in the phase of the fringe pattern is a proportional measurement of the relative movement between the scale 14 and the detector 20.

The reference track 18 generates an optical line pattern on the detector 20 that extends in the direction of motion along line 28. As described in more detail below, this line pattern is utilized to generate a measure of the relative alignment between the scale 14 and the sensor apparatus 10 in the Y direction.

Figure 2:
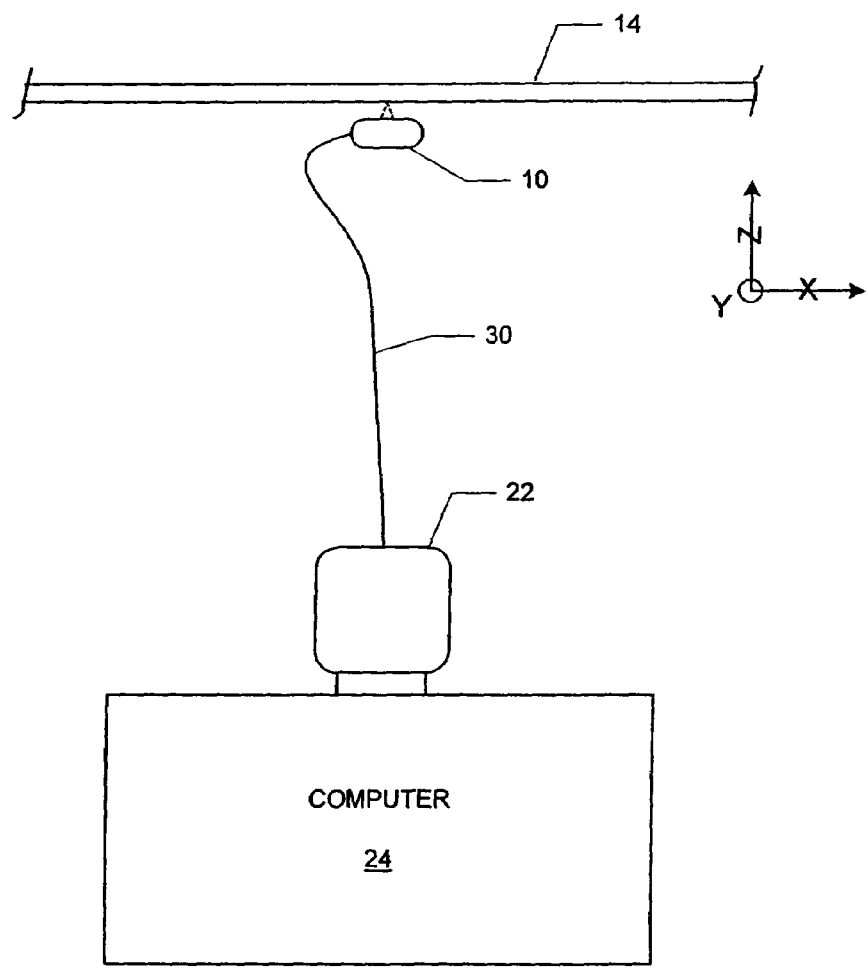
FIG. 2 is a schematic diagram illustrating physical relationships among various components in the optical position encoder system of FIG. 1.

FIG. 2 illustrates the system of FIG. 1 from a more physical perspective. In the illustrated embodiment, the sensor apparatus 10 is relatively stationary and is placed in close physical proximity to the scale 14, which moves in the X direction relative to the sensor apparatus 10. The sensor apparatus 10 is connected to the signal processor 22 by a cable 30. The signal processor 22 is directly connected to the computer 24, for example at a serial input/output port. During the alignment process described below, a user moves the sensor apparatus 10 in the Y direction (in and out of the page in FIG. 2) while monitoring a display that shows both direction and magnitude of misalignment. The display helps the user to determine which direction and how far to move the sensor apparatus 10 to improve alignment, and also provides an indication when satisfactory alignment has been achieved.

Figure 3:
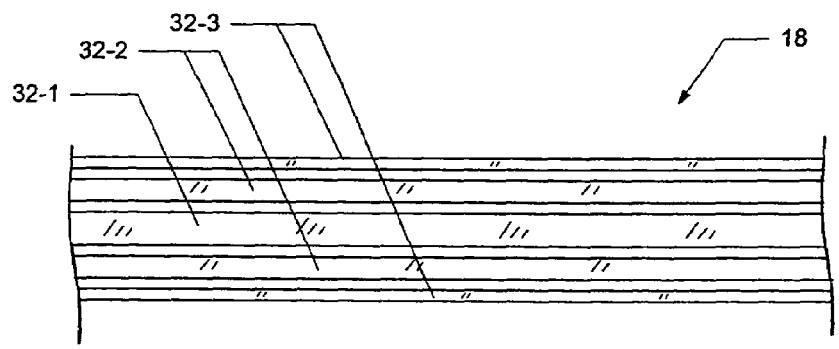
FIG. 3 is a diagram of a diffractive optical element on a scale in the optical position encoder system of FIG. 1 used to provide alignment indication.

FIG. 3 illustrates the reference track 18, which consists of several elongated, spaced-apart horizontal stripes 32. In particular, there is a relatively wide central stripe 32-1 and successively narrower outer stripes 32-2 and 32-3. These form a diffractive element that is commonly referred to as a "binary lens". In conjunction with the light from the source 12 (FIG. 1), the binary lens creates a strip of light at the detector 20 that is elongated in the X direction. As described in more detail below, the strip of light is detected by the detector 20 in such a way as to provide indications of both Y-axis alignment and "theta-Z" alignment, i.e., the relative rotational orientation of the sensor apparatus 10 with respect to the scale 14 about the Z axis.

Although in the illustrated embodiment a binary lens is utilized for the reference track 18, other types of patterns could also be employed, including for example a single elongated stripe. In a reflective encoder embodiment, the stripe of light can be created using a solid reflective line on a non-reflective background, or vice-versa. A diffractive pattern such as the illustrated binary lens will work with either a reflective or non-reflective background.

Figure 4:
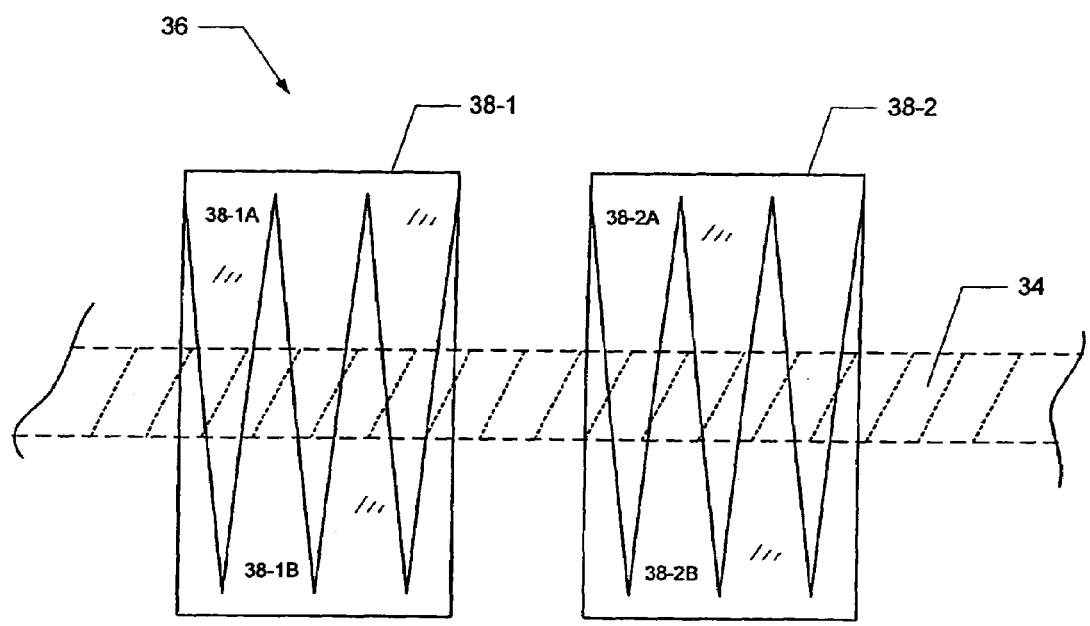
FIG. 4 is a diagram of a first alignment-indicating optical detector in the optical position encoder system of FIG. 1.

FIG. 4 shows a portion of the detector 20 that is utilized to detect the above-mentioned strip of light 34 generated by the reference track 18 of FIG. 1. This part of the detector is termed the "reference track detector" 36. It will be understood that the detector 20 also includes other detector elements, not shown, that are utilized to detect the main track 16 for purposes of measuring movement in the X direction. Such other elements are omitted in the present description for clarity.

The reference track detector 36 includes two separate bi-cell elements 38, shown as 38-1 and 38-2 respectively. Each of the elements 38 has two separate photosensitive cells A and B (shown as 38-1A, 38-1B, 38-2A, and 38-2B). Each of the A and B cells has a triangular or sharks-tooth shape, with the upper A cell being intermeshed with the lower B cell. It will be appreciated that the response of each cell to the strip of light 34 varies with the Y-axis location of the strip of light 34 with respect to the cell. For example, the outputs from cells 38-1A and 38-2A are greater when the strip of light 34 is located more upwardly in FIG. 4, because a greater area of each cell is exposed to the light. The outputs from cells 38-1A and 38-2A are smaller when the strip of light 34 is located more downwardly in FIG. 4. For cells 38-1B and 38-2B, the dependence is inverted—their respective outputs are greater when the strip of light 34 is more downward. The illustrated complementary configuration provides a self-normalized way of detecting the Y-axis position of the strip of light 34. Normalized output values are calculated as follows:

Normalized output of element 38-1=OUT1=(1$A$−1$B$)/ (1$A$+1$B$)

Normalized output of element 38-2=OUT2=(2$A$−2$B$)/ (2$A$+2$B$)

where "1A" refers to the electrical output from cell 38-1A, etc.

Either OUT1 or OUT2 can be used as the indicator of Y-axis alignment. Alternatively, their values may be averaged to obtain Y-axis alignment.

To obtain an indication of theta-Z alignment, the following calculation can be used:

Theta-$Z$=arctangent (OUT1−OUT2)/$D$ where D is the separation between the centers of the two bi-cells 38-1 and 38-2.

Figure 5:
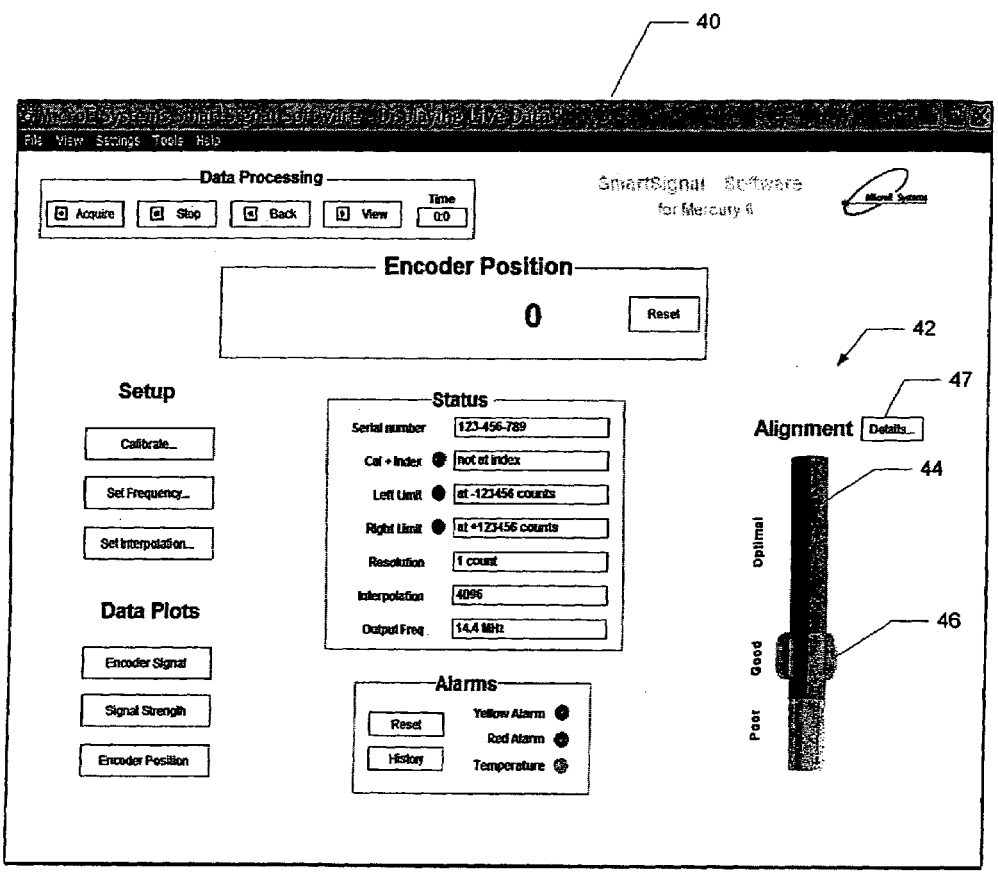
FIGS. 5 and 6 are screen shots of user interface screens displayed in the optical position encoder system of FIG. 1 for providing alignment information to a user.
Figure 6:
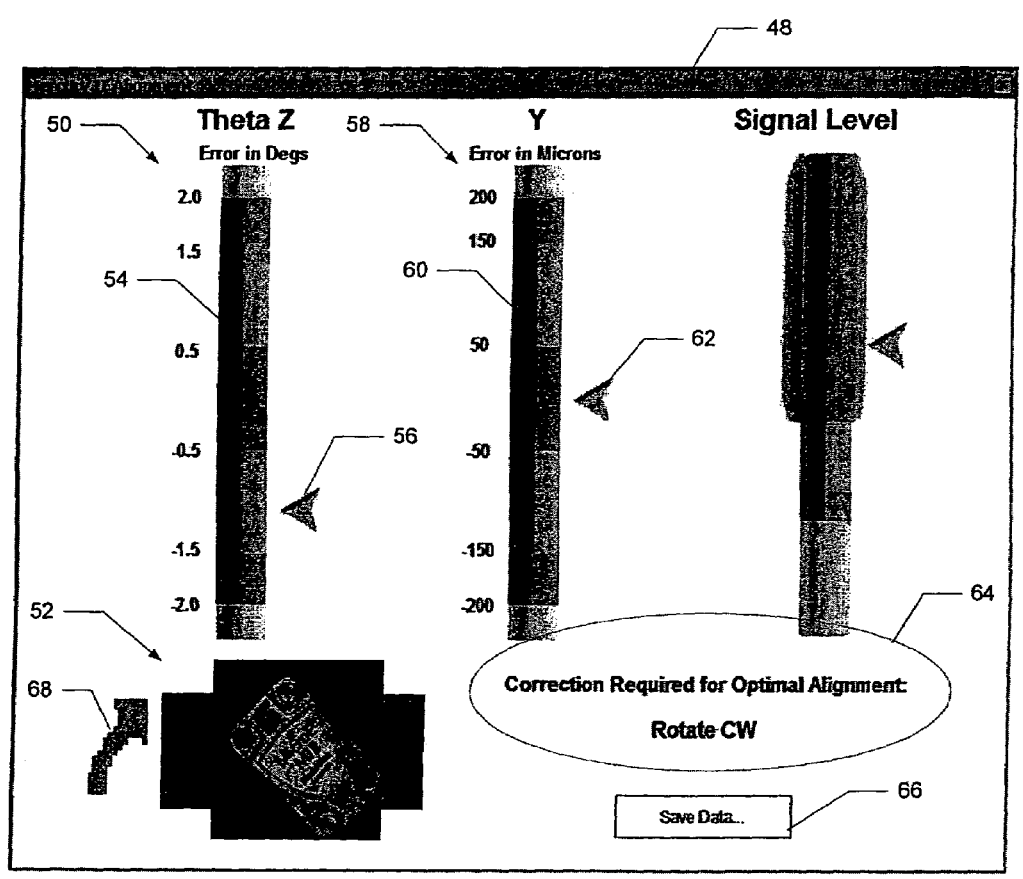

FIGS. 5 and 6 show two graphical user interface screens displayed on the computer 24 of FIG. 1 in conjunction with a process of measuring and/or adjusting the alignment between the scale 14 and the sensor apparatus 10. In FIG. 5, a first user screen 40 includes a general or composite alignment indicator 42, which as shown includes a bar-like scale 44 having segments labeled "Poor", "Good", and "Optimal" along with a software-adjustable, collar-like marker 46 whose position on the scale 44 corresponds to the measured alignment characteristics. This composite indication includes as components both the y-alignment and the theta-z alignment. It may additionally include the Lissajous amplitude if desired. A user-selectable button 47 labeled "Details . . . " enables a user to navigate to a second screen 48, described below with reference to FIG. 6, that displays the individual components included in the composite indication.

Referring to FIG. 6, the screen 48 includes a theta-Z alignment indicator 50 along with an icon 52 depicting the sensor apparatus 10. The Z-alignment indicator 50 includes a bar-like scale 54 and an arrowhead-shaped marker 56. Also included is a Y alignment indicator 58, which also includes a bar-like scale 60 and a marker 62. It will be noted that both scales 54 and 60 are bipolar, that is, they can indicate polarity as well as magnitude of misalignment. At the lower right are an instruction 64 for an action to be taken to improve alignment, and a "Save Data . . . " button 66 that enables a user to store the current alignment values into a file. The saved data can be used for a variety of purposes, including for example statistical process control of a manufacturing process.

The screen 48 can be used for both measuring and adjusting the scale-to-sensor alignment. For measurement only, a user can simply observe the indications from the indicators 50 and 58, and either transcribe these values or save them via the Save Data button 66. In the illustrated embodiment, the theta-Z indicator 50 provides indications in the range of +/−2.0 degrees, and the Y-alignment indicator 58 provides indications in the range of +/−200 microns. For a given relative position of the scale 14 and sensor apparatus 10, the values on the screen 48 should be constant, notwithstanding the fact that the signal processor 22 and computer 24 are continually sampling the outputs of the detector 36 and updating the calculations of the theta-Z and Y alignment values.

During an alignment process, a user can physically move the sensor apparatus 10 with respect to the scale 14 and observe the alignment indications change accordingly. Movements in the Y direction are reflected in the position of the marker 62 of the Y-alignment indicator 58. Rotational movements about the Z axis are reflected in the position of the marker 56 in the theta-Z alignment indicator 50. The sensor apparatus 10 is optimally aligned when each of the markers 56 and 62 is at or near the middle point, or zero, of the respective scale 54 or 60. As an additional aid, the icon 52 illustrates the theta-Z misalignment in an exaggerated manner, and an arrow 68 indicates which direction the sensor apparatus 10 should be rotated to improve theta-Z alignment. As a user rotates the sensor apparatus 10, the orientation of the sensor apparatus 10 depicted in the icon 52 also rotates, so the user can readily see when correct theta-Z alignment has been achieved.

In the grayscale images of FIGS. 5 and 6, different segments of the scales 44, 50 and 58 are shown with different levels of gray, which may be useful in a monochrome display. If a color display is employed, it may be preferable to employ other colors. For example, the segments corresponding to optimal alignment may have the color green. Segments corresponding to intermediate quality may be yellow, and segments corresponding to poor quality may be red. Other color schemes may of course be employed. Additionally, numerical values for the alignment error can also be displayed in conjunction with the graphical indicators.

In an alternative embodiment, alignment indication information derived by the signal processor 22 can be provided to a user in the form of a set of color-coded light-emitting diodes (LEDs) or similar indicators, either in addition to or instead of the graphical user interface depicted in FIGS. 5 and 6. It may be convenient to locate such indicators on the physical housing of signal processor 22, for example, or on the housing of the sensor apparatus 10. As a further alternative, a user may use a separate set-up tool instead of the computer 24, which may include indicators that can be used to convey the alignment information. If a sufficient number of indicators are used, it may be possible to represent some or all of the same ranges of alignment depicted on the screen 48. It may be necessary or desirable to use a smaller number of indicators, in which it may be necessary to represent the alignment information in a coarser manner.

Figure 7:
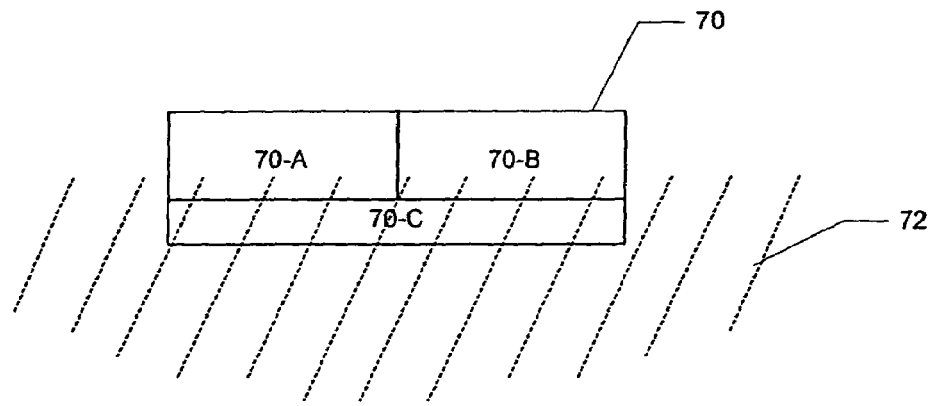
FIGS. 7–12 are diagrams of alternative optical detectors suitable for use in the optical position encoder system of FIG. 1 for providing alignment indication.
Figure 8:
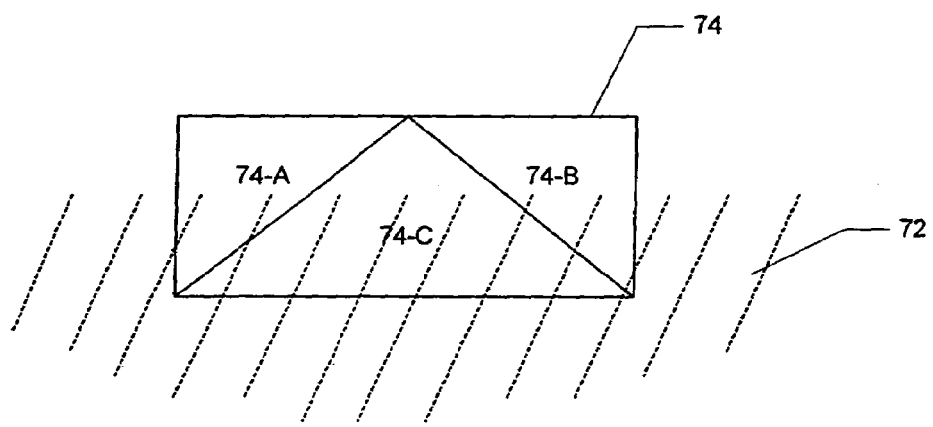

Turning now to FIGS. 7 and 8, illustrated are alternative configurations of the reference track detector 36 that can be used to provide Y-axis and theta-Z alignment information. In FIG. 7, an alignment detector 70 has three rectangular cells A, B and C (shown as 70-A, 70-B and 70-C respectively).

The detector 70 is placed at an edge of a main optical pattern 72 generated by the main track 16 (FIG. 1). In particular, ideal Y-alignment is defined to exist when the upper edge of the optical pattern 72 bisects the cells 70-A and 70-B. Y-alignment is calculated as follows:

$$(A+B)/C$$

The range of this value is dependent on the relative sizes of the cell 70-C versus either cell 70-A or 70-B. If the sizes of these cells are all equal, then the range of the Y-alignment value is 0–2, and the value is equal to 1 at the position of ideal Y alignment.

Theta-Z alignment is calculated as follows:

$$(A-B)/C$$

With equal-size cells, the range of this value is −1 to +1, and the value is equal to zero at the position of ideal theta-Z alignment.

FIG. 8 shows another alternative detector 74 having triangular cells 74-A, 74-B and 74-C. The detector 74 operates in a manner similar to the detector 70, and in particular the same calculations can be used for the Y and theta-Z alignment values. When the cells are all of the same size, the ranges for Y and theta-Z are 0–1 and −½ to +½, respectively.

While the detectors 70 and 74 of FIGS. 7 and 8 are described as being used at an edge of the main optical pattern 72, in alternative embodiments the detector 70 or 74 may be placed at the edge of a separate, relatively wide strip of light that may be dedicated to the alignment purpose, such as the strip of light 34 (FIG. 4) from a separate reference track. Such alternatives also apply to detectors described below with reference to FIGS. 9 and 11–12.

Figure 9:
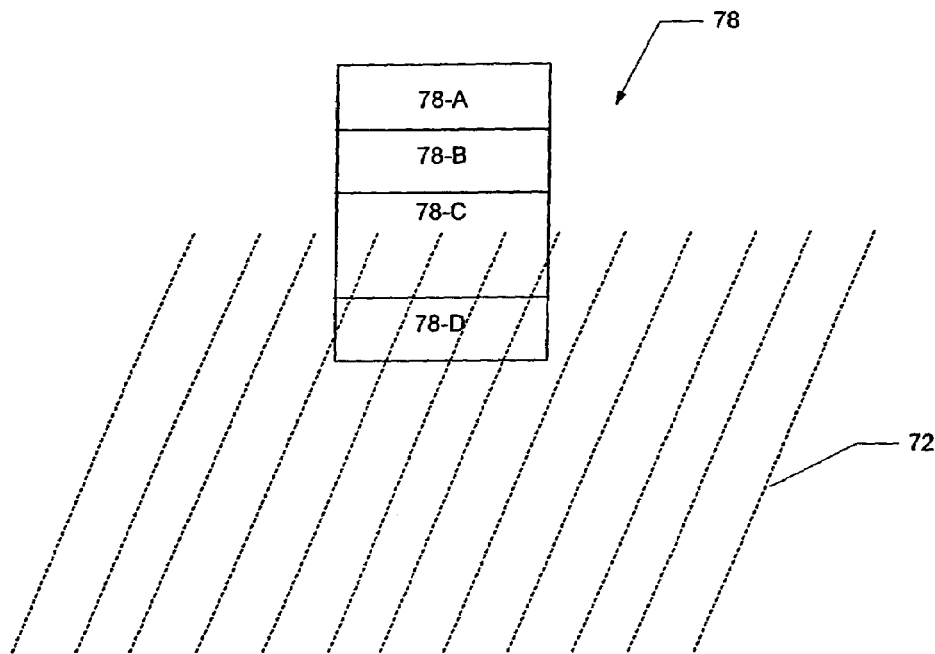

FIG. 9 shows yet another alternative detector 78. The polarity and magnitude of any misalignment can be detected by comparing the outputs of individual cells of the detector with a predetermined threshold, which is generally set slightly above the level of electrical and/or optical noise over the entire range of operating conditions. This processing can be accomplished using comparator circuits, and therefore there is no need for more sophisticated signal processing that requires algebraic computation, such as described above in connection with the detectors 36, 70 and 74.

In particular, the detector 78 has four cells 78-A through 78-D as shown, and normally is disposed at an edge of the main optical pattern 72. The alignment information from the detector 78 can be summarized as shown below. Each letter represents the output of a comparator for the corresponding cell, and the indications (moderate) and (greater) signify progressively greater amounts of misalignment in a particular direction, referred to as "up" and "down".

| A | B | C | D | Alignment |
|---|---|---|---|---|
| 0 | 0 | 0 | 0 | Down (large) |
| 0 | 0 | 0 | 1 | Down (moderate) |
| 0 | 0 | 1 | 1 | Aligned |
| 0 | 1 | 1 | 1 | Up (moderate) |
| 1 | 1 | 1 | 1 | Up (large) |

If LED indicators are used as discussed above, the outputs of the comparators can be used to drive LEDs of corresponding colors to provide a visual indication to a user. A single green LED can be used to indicate that alignment is correct. Two yellow LEDs can be used to indicate that alignment is off a moderate amount in the corresponding direction (high or low), and similarly two red LEDs can be used to indicate that alignment is off by an even greater amount. Depending on how the indicators are configured, it might be possible for multiple indicators to be illuminated simultaneously, or for no indicators to be illuminated when the alignment falls between threshold values. Such potentially confusing operating states can be eliminated by comparing the outputs of the cells against each other; i.e., only the cell having the greatest output has its corresponding LED illuminated. Also, cell sizes and/or amplifier gains can be tuned to establish which cells are on for a given in-between alignment condition; i.e., to determine when the yellow LED is turned on and the green LED is turned off. It should be noted that the detector arrangement of FIG. 9 does not provide theta-z alignment information. However, theta-z information can be obtained by adding another set of similar elements spaced apart from the elements 78-A–78-D along the X axis. Theta-z indications can be obtained using additional comparators whose outputs are combined in a manner analogous to that described above for the y-alignment indication.

In the detector 78 of FIG. 9, additional cells can be added for increased resolution if desired. This alternative is also applicable to the comparator-based detectors described below with reference to FIGS. 10–11. Additionally, the respective Y-axis dimensions of the individual cells in each element can be varied as may be desirable to provide a greater or lesser range for individual "states" of the detector (each state corresponding to one line in the above table).

Figure 10:
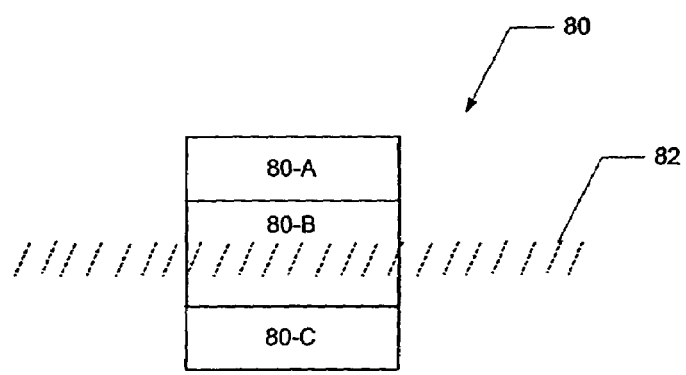

FIG. 10 shows an alternative detector 80 suitable for use with a relatively narrow stripe of light 82, such as might be generated by the above-described techniques. In the aligned position, the stripe 82 is located in the middle of a B cell 80-B. The alignment information can be summarized as follows:

| A | B | C | Alignment |
|---|---|---|---|
| 0 | 0 | 1 | Down (moderate) |
| 0 | 1 | 0 | Aligned |
| 1 | 0 | 0 | Up (moderate) |

Figure 11:
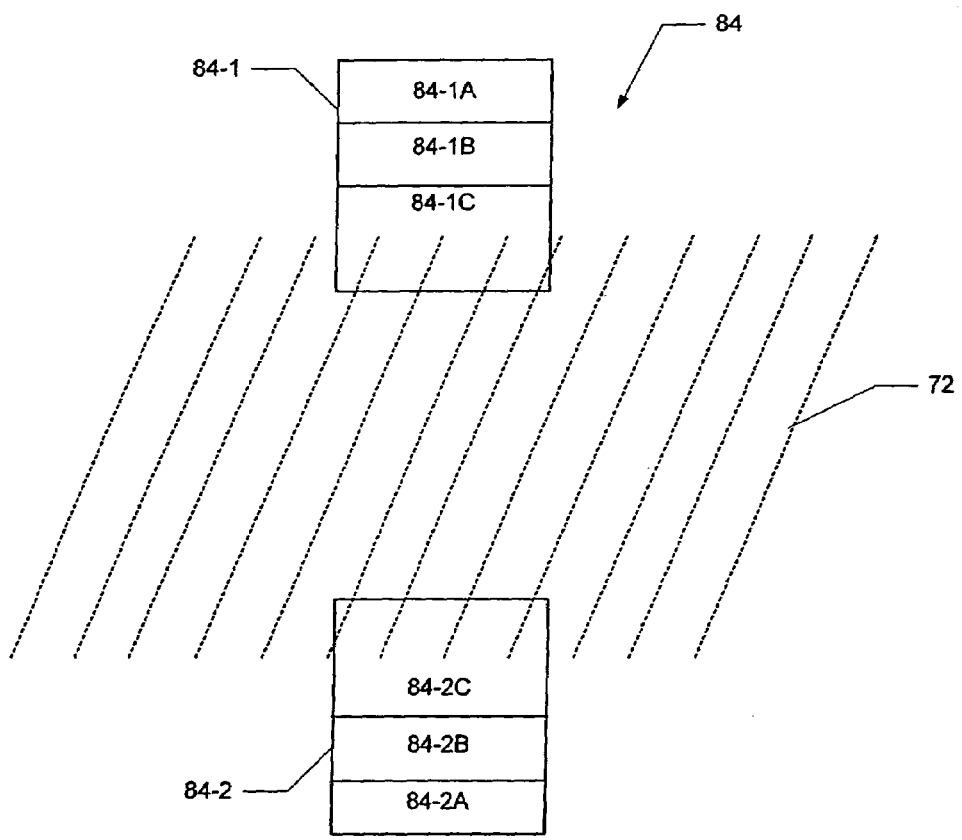

FIG. 11 shows an alternative detector 84 employing two multi-cell elements 84-1 and 84-2. Each element includes three cells with label suffixes "A", "B" and "C" respectively. The polarity and magnitude of any misalignment is detected by comparing the outputs of the cells with a predetermined threshold. If the outputs of the different cells are kept separate, then the direction and magnitude of misalignment can be summarized by the following table:

| 1A | 1B | 1C | 2C | 2B | 2A | Alignment |
|---|---|---|---|---|---|---|
| 0 | 0 | 0 | 1 | 1 | 1 | Down (large) |
| 0 | 0 | 0 | 1 | 1 | 0 | Down (moderate) |
| 0 | 0 | 1 | 1 | 0 | 0 | Aligned |
| 0 | 1 | 1 | 0 | 0 | 0 | Up (moderate) |
| 1 | 1 | 1 | 0 | 0 | 0 | Up (large) |

The outputs from same-lettered cells can be connected together for greater signal amplitude if desired, although in such an embodiment the directionality information will be lost. The following table summarizes the information obtained when the outputs are electrically connected:

| A | B | C | Alignment |
|---|---|---|---|
| 0 | 0 | 1 | Aligned |
| 0 | 1 | 1 | No direction (moderate) |
| 1 | 1 | 1 | No direction (greater) |

Although there is no direction information given in any of the misaligned states, in an alignment process the direction can be inferred by trial and error. If movement in one direction causes the magnitude to increase, then the movement is away from the aligned position. Movement towards the aligned position will cause the indicated magnitude of misalignment to decrease.

As mentioned above, the detectors of FIGS. 9–11 can employ comparators to compare the outputs of the various cells to fixed thresholds. As an alternative, it may be desirable to compare the output of each cell to the output(s) of other cell(s). Such a ratiometric processing approach can improve robustness in some cases, for example by avoiding false indications that might occur if overall signal levels are low.

Figure 12:
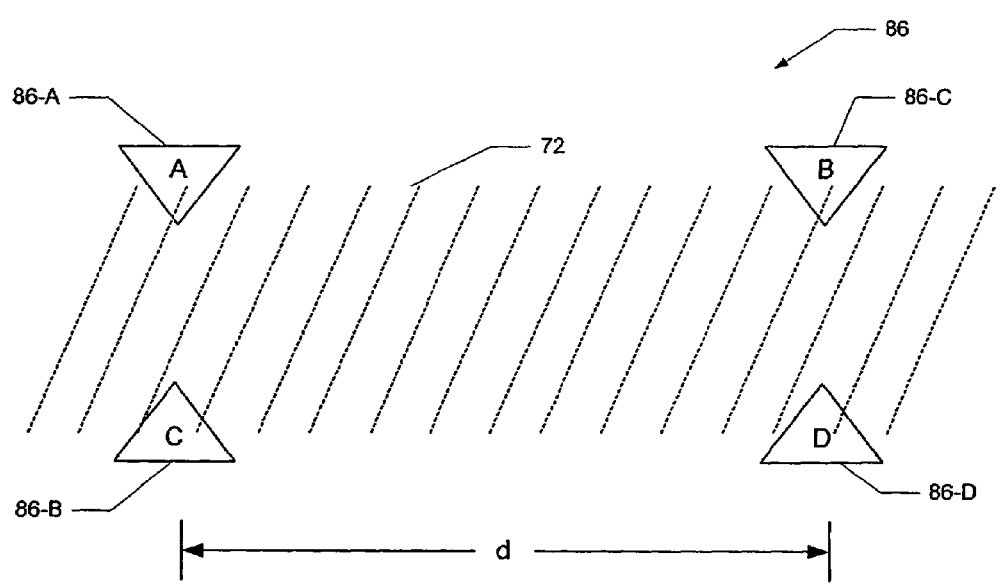

FIG. 12 shows another multi-cell detector 86 that is similar to the detector 36 (FIG. 3) insofar as requiring computation based on its outputs rather than simple threshold comparisons. Four triangular cells 86-A through 86-D are arranged at the corners of an imaginary rectangle of width d that straddles the main track optical pattern 72, with the two cells 86-A and 86-B residing at the top edge of the optical pattern 72 and the two cells 86-C and 86-D residing at the bottom edge of the optical pattern 72. The outputs of these cells can be processed as follows to obtain y and theta-z alignment information:

let $L=(A-C)/(A+C)$, $R=(B-D)/(B+D)$; note range of L and R is −1 to 1

$Y$-alignment$=(L+R)/2$

Theta-$z$ alignment$=\arctan((L-R)/W)$

In general, it will be desired that alignment indicators such as disclosed herein are calibrated in some fashion to obtain optimal performance. For example, a calibration process will employ a reference set-up in which the scale and the detector are aligned to a high degree of precision, and then the alignment indications from the detectors are obtained. To the extent that these values indicate misalignment, they may be used to generate compensation values that will be applied to the alignment indications when the alignment indicators are being utilized in a monitoring or alignment process. Such a calibration process can compensate for a variety of factors, such as amplifier and detector cell imbalances, built-in misalignments, and variations in the profile of the light beam generated by the source.

While in the foregoing description the various alignment indicators are described primarily with reference to an alignment process, more generally the alignment indicators simply provide alignment information whose use is not limited to an alignment process. For example, alignment data can be obtained from the alignment indicators during operation and/or during a specific alignment-checking step. This data can be used to monitor how alignment may be changing during operation of the encoder. It can also be included in statistical process control (SPC) measurements/parameters in conjunction with processes of production and quality control.

Additionally, the disclosed techniques may be used with transmissive gratings as opposed to the reflective grating shown herein, and may also be used in a rotary encoder with an annular grating as opposed to the linear encoder and grating shown herein. In a rotary encoder, a slightly different coordinate reference is used. The Y and X axes of the linear encoder are replaced by radial (R) and angular (θ) axes respectively, i.e., the angular direction is the direction of relative motion being measured, and the radial direction is the direction in which alignment is to be measured/corrected. In a rotary encoder, offsets or compensation values may be utilized in a known manner in the signal processing to compensate for the curvature of the grating.

What is claimed is:

1. An optical encoder, comprising:
   an optical source;
   a scale spaced apart from the source, the scale extending in a direction of relative motion between the scale and the source, the scale being operative in conjunction with a light beam from the optical source to generate an optical pattern at a detector location;
   an optical detector at the detector location, the optical detector being operative to generate analog detector output signals being indicative of the location of the optical pattern on the detector in an alignment direction orthogonal to the direction of relative motion between the scale and the source; and
   signal processing circuitry operative in response to the analog detector output signals to generate an alignment value indicating a polarity and a magnitude of misalignment in the alignment direction between the optical detector and the scale.

2. An optical encoder according to claim 1, wherein:
   the analog detector output signals are indicative of the location of the optical pattern on the optical detector at two or more locations spaced apart in the direction of relative motion between the scale and the source; and
   the signal processing circuitry is further operative in response to the analog detector output signals to generate a theta-Z-alignment value indicating a polarity and a magnitude of rotational misalignment about a Z axis extending between the optical detector and the scale.

3. An optical encoder according to claim 1, wherein the scale includes a diffractive optical element operative to generate the optical pattern.

4. An optical encoder according to claim 3, wherein the diffractive optical element includes a set of spaced-apart stripes.

5. An optical encoder according to claim 1, wherein the optical detector includes a bi-cell element having two photosensitive cells with complementary shapes.

6. An optical encoder according to claim 5, wherein each of the photosensitive cells has a sharks-tooth shape.

7. An optical encoder according to claim 1, wherein the optical detector includes three cells, two of the cells being arranged in the direction of relative motion, and the third cell being arranged in the alignment direction with respect to the two cells.

8. An optical encoder according to claim 7, wherein the cells are rectangular and wherein the two cells are arranged side-by-side.

9. An optical encoder according to claim 7, wherein the cells are triangular and the third cell is arranged in a triangular region between the two cells.

10. An optical encoder according to claim 1, wherein the optical detector includes two multi-cell elements arranged at respective edges of the optical pattern, each element including a plurality of cells arranged in the alignment direction such that in an aligned position the optical pattern impinges on only a predetermined one or more of the cells of the element, and wherein the signal processing circuitry includes a plurality of comparators having respective inputs connected to respective ones of the cells of the elements, the outputs of the comparators being collectively operative to represent the alignment value.

11. An optical encoder according to claim 10, wherein corresponding ones of the cells of the two elements are electrically connected together.

12. An optical encoder according to claim 1, wherein the optical detector includes a multi-cell element arranged at an edge of the optical pattern, the element including a plurality of cells arranged in the alignment direction such that in an aligned position the optical pattern impinges on only a predetermined one or more of the cells of the element, and wherein the signal processing circuitry includes a plurality of comparators having respective inputs connected to respective ones of the cells of the element, the outputs of the comparators being collectively operative to represent the alignment value.

13. An optical encoder according to claim 1, wherein the optical detector includes a multi-cell element having a plurality of cells arranged in the alignment direction, each cell being wider than the optical pattern in the alignment direction such that in an aligned position the optical pattern impinges on only a central one of the cells, and wherein the signal processing circuitry includes a plurality of comparators having respective inputs connected to respective ones of the cells of the element, the outputs of the comparators being collectively operative to represent the alignment value.

14. An optical encoder according to claim 1, wherein the optical detector includes four triangular cells disposed at the corners of an imaginary rectangle straddling the optical pattern, and wherein the signal processing circuitry is operative to combine the outputs of the cells to derive both the alignment value for the alignment direction as well as an alignment value for a theta-Z direction about a Z axis separating the scale and the detector.

15. An optical encoder according to claim 1, wherein signal processing circuitry is operative to perform a differential calculation on the detector output signals to generate the alignment values.

16. An optical encoder according to claim 1, wherein signal processing circuitry is operative to perform a normalization calculation on the detector output signals to generate the alignment values.

17. A method of providing information to a user regarding alignment of an optical detector and an encoder scale in an alignment direction of an optical encoder, the alignment direction being orthogonal to a direction of relative motion between the optical detector and the encoder scale, the method comprising:
obtaining optical detector output signals indicative of the location of an optical pattern on the optical detector in the alignment direction, the optical pattern being generated by the encoder scale in conjunction with a light beam from an optical source;
continually generating alignment values in response to the detector output signals, each alignment value indicating a polarity and a magnitude of misalignment in the alignment direction between the optical detector and the encoder scale; and
displaying a graphical alignment indicator having an indicator scale and a marker, the indicator scale being a bipolar indicator scale capable of indicating both polarity and magnitude of misalignment, the location of the marker being based on the alignment values such that the magnitude and polarity of misalignment in the alignment direction between the optical detector and the indicator scale are indicated by the graphical alignment indicator.

18. A method according to claim 17, wherein the analog detector output signals are indicative of the location of the optical pattern on the optical detector at two or more locations spaced apart along the direction of relative motion between the scale and the source, and further comprising:
continually generating theta-Z-alignment values in response to the analog detector output signals, each theta-Z alignment value indicating a polarity and a magnitude of rotational misalignment about a Z axis extending between the optical detector and the scale; and
displaying a graphical theta-Z alignment indicator having an indicator scale and a marker, the indicator scale being a bipolar indicator scale capable of indicating both polarity and magnitude of rotational misalignment about the Z axis, the location of the marker being based on the theta-Z alignment values such that the magnitude and polarity of theta-Z misalignment between the optical detector and the indicator scale are indicated by the graphical theta-Z alignment indicator.

19. A method according to claim 17, wherein the optical detector includes a bi-cell element having two photosensitive cells with complementary shapes, and wherein the alignment values are generated by performing both a differential calculation and a normalization calculation on the detector output signals.

20. A method according to claim 19, wherein each of the photosensitive cells has a sharks-tooth shape.

21. A method according to claim 17, wherein the indicator scale includes a plurality of segments corresponding to respective degrees of alignment.

22. A method according to claim 21, wherein the segments include three segments corresponding to poor, acceptable, and optimal alignment respectively.

23. A method according to claim 21, wherein the segments are of different colors.

24. A method according to claim 23, wherein the colors include green, yellow and red, the green segment corresponding to optimal alignment, the yellow segment corresponding to acceptable alignment, and the red segment corresponding to poor alignment.

25. A method according to claim 17, wherein the marker includes a pointer arranged alongside the scale.

26. A method according to claim 17, further comprising displaying an icon depicting the physical orientation of the optical detector with respect to the scale.

27. A method according to claim 17, further comprising displaying a user control enabling a user to save the alignment values in a computer file.

28. A method of aligning an optical detector and an encoder scale in an alignment direction of an optical encoder, the alignment direction being orthogonal to a direction of relative motion between the optical detector and the encoder scale, the method comprising:
performing the information-providing method of claim 17; and
as the graphical alignment indicator is being displayed, adjusting the relative positions of the scale and the optical detector while monitoring the display, the adjusting continuing until the alignment indicator indicates that a desirable degree of alignment has been achieved.

29. A computer program product that includes a computer readable medium having instructions stored thereon for providing information to a user regarding alignment of an optical detector and an encoder scale in an alignment direction of an optical encoder, the alignment direction being orthogonal to a direction of relative motion between the optical detector and the encoder scale, such that the instructions, when carried out by a computerized system, cause the computerized system to:

obtain optical detector output signals indicative of the location of an optical pattern on the optical detector in the alignment direction, the optical pattern being generated by the encoder scale in conjunction with a light beam from an optical source;

continually generate alignment values in response to the detector output signals, each alignment value indicating a polarity and a magnitude of misalignment in the alignment direction between the optical detector and the encoder scale; and display a graphical alignment indicator having an indicator scale and a marker, the indicator scale being a bipolar indicator scale capable of indicating both polarity and magnitude of misalignment, the location of the marker being based on the alignment values such that the magnitude and polarity of misalignment in the alignment direction between the optical detector and the indicator scale are indicated by the graphical alignment indicator.

30. A computer program product that includes a computer readable medium having instructions stored thereon for aligning an optical detector and an encoder scale in an alignment direction of an optical encoder, the alignment direction being orthogonal to a direction of relative motion between the optical detector and the encoder scale, such that the instructions, when carried out by a computerized system, cause the computerized system to:

perform the information-providing instructions of claim 29; and as the graphical alignment indicator is being displayed, adjust the relative positions of the scale and the optical detector while monitoring the display, the adjusting continuing until the alignment indicator indicates that a desirable degree of alignment has been achieved.

* * * * *